Jan. 11, 1966  E. R. MICKLE  3,229,183
ELECTRIC MOTOR CONTROL
Filed Nov. 24, 1961  4 Sheets-Sheet 1

INVENTOR
EDWIN R. MICKLE
BY Brown & Rosen

Jan. 11, 1966  E. R. MICKLE  3,229,183
ELECTRIC MOTOR CONTROL
Filed Nov. 24, 1961  4 Sheets-Sheet 2

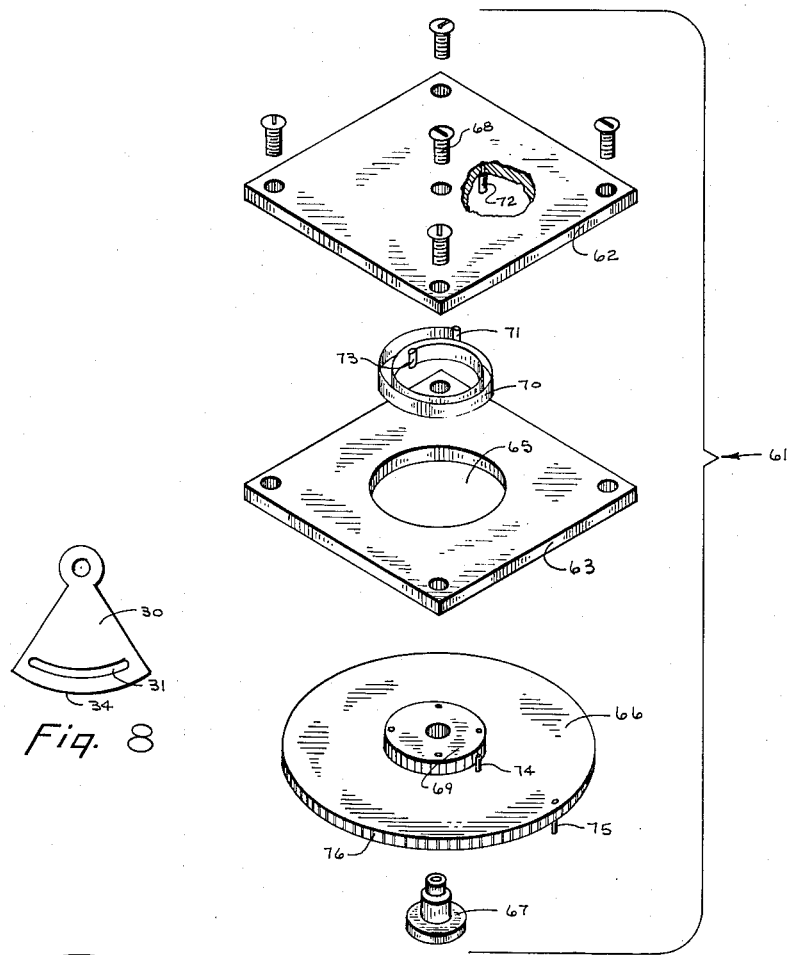
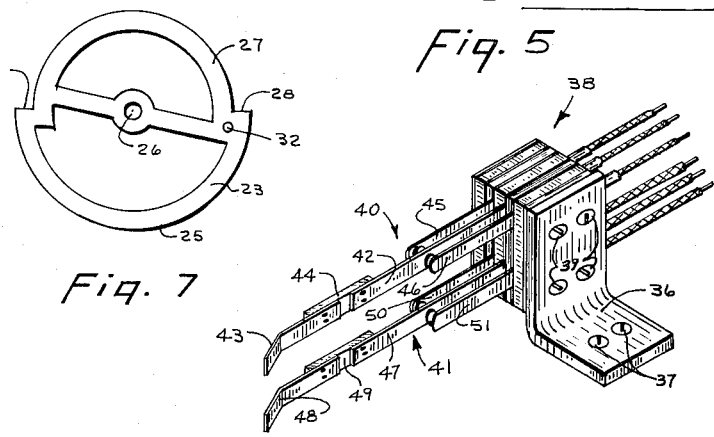
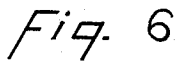

United States Patent Office 3,229,183
Patented Jan. 11, 1966

3,229,183
ELECTRIC MOTOR CONTROL
Edwin R. Mickle, 3200 W. Golf Course Road,
Midland, Tex.
Filed Nov. 24, 1961, Ser. No. 154,535
2 Claims. (Cl. 318—476)

The present invention relates to an electric motor control actuated by load changes in the electric motor.

The primary object of the invention is to provide an electric motor control which will interrupt the flow of electricity to the electric motor upon a predetermined change in the electric demand, of the motor, which continues for a predetermined period of time.

Another object of the invention is to provide means for stopping an electric motor when the electric demand of the motor drops for a predetermined period of time.

A further object of the invention is to provide a device of the above character in which the demand drop required to stop the electric motor may be adjustably predetermined.

The present invention is particularly useful in the petroleum industry but is of general utility and may be used in other installations, such as dough mixing machines, etc.

In the pumping of oil wells, it is conventional to use an electric motor-driven apparatus on the surface connected by sucker rods to a pump positioned at the bottom of the well. Ideally, the pump should be of a capacity such that continuous operation would produce the fluid as fast as it enters the well bore from the oil-bearing formation. From a practical standpoint, such operation is seldom possible and since maximum production is desired, the pumps quite often are operated at a rate faster than the flow of oil into the well bore. Under such operation, eventually the pumping rate is reduced, due to lack of supply, producing a condition known as "pump off."

We are primarily concerned here with pumps that use an electric motor as the prime mover and, of course, the amount of electric energy used in a given time is a direct result of the amount of fluid being pumped from the well. At the beginning of a pumping cycle when the pump is producing at its maximum rate, there is a certain average load, or electric demand, on the motor. As the amount of fluid being pumped lessens, there is a corresponding average lesser load on the motor and a smaller average electric demand.

During one "stroke cycle," there is such a very wide range in electric demand that instantaneous measurements would be inconclusive. Furthermore, as a well pumps, it very often happens that a slug of gas vapor gets into the tubing and, until it is pumped out, there is a smaller load on the motor; this condition rarely exists for more than a very few minutes. Therefore, any measurement of work being done by the motor must be averaged over some period of time in order to accommodate these variables.

It is an object of this invention to provide an instrument which will integrate the rate at which electric energy is being used and, whenever this rate lessens, automatically cut off the flow of electricity, thereby shutting down the well. Since the rate at which energy is being used varies continuously throughout each particular "stroke cycle" of the pump, this device will integrate the rate at which energy is being used over a period of time covering several "stroke cycles" of the pump.

Other objects and advantages will become apparent in the following specification when taken in light of the attached drawings in which:

FIGURE 5 is an exploded perspective view of the ratchet wheel assembly;

FIGURE 6 is a perspective view of another switch block;

FIGURE 7 is a plan view of the run cam;

FIGURE 8 is a plan view of the adjusting segment; and

Figure 1:
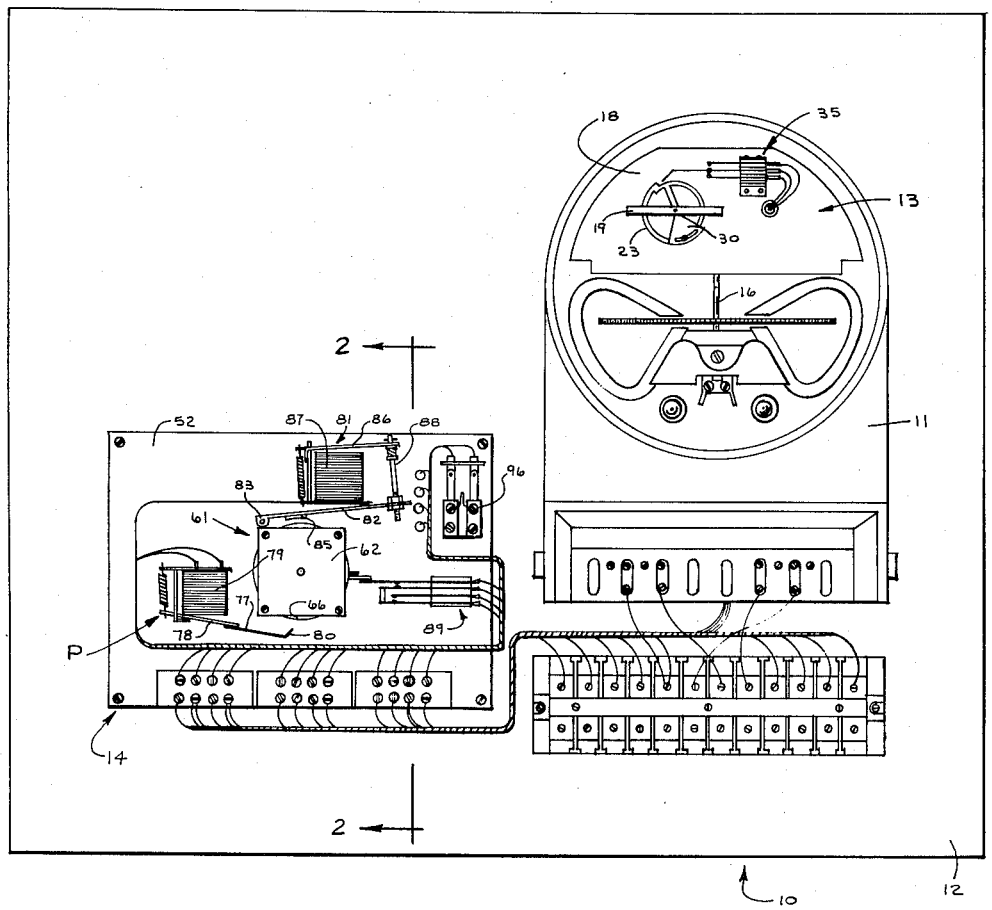
FIGURE 1 is a top plan view of the invention.

Referring now to the drawings in detail wherein like reference characters indicate like parts throughout the several figures, the reference numeral 10 indicates generally an electric motor control constructed in accordance with the invention. The electric motor control 10 includes a conventional induction-type watt-hour meter 11 mounted on a plate 12 and having the normal register (not shown) replaced with a cam switch assembly indicated generally at 13.

A timer mechanism 14 is mounted on the plate 12 adjacent the watt-hour meter 11 and is associated with the watt-hour meter 11 in a manner described below.

The watt-hour meter 11 is electrically connected to an electric motor 15 in a conventional manner to measure the electric energy supplied to the motor 15. The revolutions of the disk shaft 16 in a given time interval is proportional to the electric energy passing through the watt-hour meter 11 to the electric motor 15.

Figure 4:
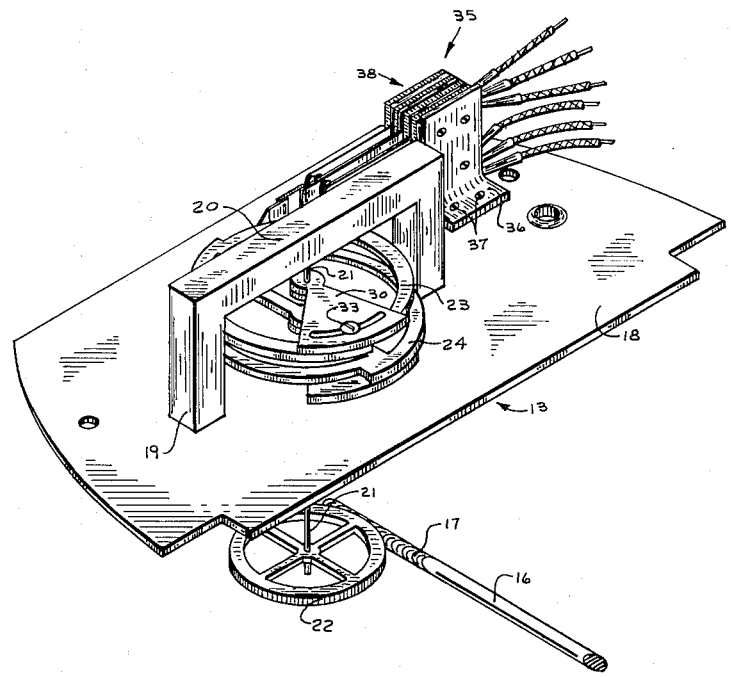
FIGURE 4 is a perspective view of a switch mechanism shown detached from the remainder of the apparatus.

Referring to FIGURES 1 and 4, it can be seen that the conventional disk shaft 16 has a worm gear 17 formed on one end thereof. A mounting plate 18 is secured to the meter 11 in the position normally occupied by the register (not shown). A yoke 19 is secured to the mounting plate 18 and extends outwardly therefrom. The yoke 19 is of generally U-shaped configuration and includes a transversely extending central portion 20, as can be clearly seen in FIGURE 4. A cam shaft 21 is journaled in the central portion 20 of the yoke 19 and extends through and is journaled in the mounting plate 18. A spur gear 22 is fixed to the end of the cam shaft 21 opposite the central portion 20 of the yoke 19. The cam shaft 21 extends perpendicularly to the disk shaft 16 and the spur gear 22 is in mesh with the worm gear 17 to be driven thereby.

A run cam 23 and a set cam 24 are fixedly secured to the cam shaft 21 in spaced apart parallel relation between the mounting plate 18 and the yoke 19. The structure of the run cam 23 and the set cam 24 is identical with the cams 23 and 24 positioned on the shaft 21 in inverted relation. FIGURES 7 and 8 are detailed views of the run cam shown removed from the shaft 21 for clarity of illustration. The run cam 23 has an outer cam surface 25 arranged concentric to the axis 26 of the cam 23 and extending through half of the circumference of the cam 23. The run cam 23 also has an inner cam surface 27 which is concentric to the axis 26 with a radius shorter than that of the outer cam surface 25. The inner cam surface 27 extends for the other half of the circumference of the cam 23 oppositely of the outer cam surface 25 and forms therewith a pair of shoulders 28 and 29 arranged in oppositely disposed relation, as can be clearly seen in FIGURE 7. An adjusting segment 30 is journaled on the shaft 21 adjacent each of the cams 23 and 24. The adjusting segment 30 is provided with an arcuate slot 31 arranged to overlie a threaded bore 32 in the run cam 23 and a similar threaded bore (not shown) in the set cam 24. A set screw 33 extends through the arcuate slot 31 into the threaded bore 32 and secures the adjusting segment 30 to the run cam 23 and to the set cam 24. The adjusting segments 30 each have an outer arcuate cam surface 34 with the same radius as the cam surface 25 so that the over-all length of the cam surface 25 can be adjusted by moving the adjusting segment 30 with respect thereto, after which the adjusting segment 30 is locked in place by the set screw 33.

A switch unit generally indicated at 35 includes an L-shaped bracket 36 secured to the mounting plate 18 by a pair of screws 37. The switch unit 35 includes a stack of insulating plates indicated generally at 38 secured together by a plurality of bolts 39. A single-pole double-throw switch 40 is mounted at one end between the insulating plates 38 in horizontally aligned relation to the run cam 23 and the second single-pole double-throw switch 41 is mounted between the insulating plates 38 below the single-pole double-throw switch 40 in horizontally aligned relation to the set cam 24. The pole 42 of the switch 40 has a cam follower 43 secured to the outer end thereof by an insulating block 44. The cam follower 43 engages the run cam 23 and moves the pole 42 into engagement alternately with contact arms 45, 46 as the run cam 23 revolves. The second single-pole double-throw switch 41 has the pole 47 thereof secured to a cam follower 48 by means of an insulated block 49. The cam follower 48 engages the set cam 24 so that the pole 47 is alternately engaged with the contact arms 50, 51 as the set cam 24 revolves.

A panel 52 is positioned in spaced parallel relation to the plate 12 and is secured thereto by a plurality of posts 53. The panel 52 is positioned adjacent the watt-hour meter 11 for electrical connection thereto. A reversible synchronous electric motor 54 is mounted below the panel 52 and is secured thereto in spaced relation to the plate 12. A gear train 55 is also mounted on the panel 52 on the under side thereof in driven relation to the synchronous electric motor 54. A shaft 56 forming a part of the gear train 55 extends through the panel 52 and carries a perpendicularly extending arm 57 on the upper end thereof. The shaft 56 is driven from the gear train 55 through a conventional spring-loaded disk clutch 58 which prevents stripping of the gear train 55 when the shaft 56 is stalled. The electric motor 54 is geared to the shaft 56 so that when the coil 59 is energized, the arm 57 is rotated in a clockwise direction when viewed from the free end of shaft 56. With the coil 60 energized, the arm 57 is rotated in a counterclockwise direction when viewed from the free end of the shaft 56. The coils 59, 60 are never simultaneously energized. The speed of the motor 54 is such that the arm 57 rotates at a speed of ⅕ revolution per minute in either a clockwise or a counterclockwise direction.

A ratchet wheel assembly generally indicated at 61 is positioned on the panel 52 centrally overlying the shaft 56. The ratchet assembly 61 includes a generally rectangular upper plate 62, a generally rectangular lower plate 63 secured thereto, and a plurality of posts 64 mounting the upper and lower plates 62, 63 to the panel 52 in spaced parallel relation thereto. The lower plate 63 has a relatively large diameter central bore 65 formed therein, as can be seen in FIGURE 5. A ratchet wheel 66 is journaled on a boss 67 secured to the upper plate 62 by a screw 68. The ratchet wheel 66 is spaced below the lower plate 63 and turns freely with respect thereto. A hub 69 is formed centrally on the ratchet wheel 66 and extends upwardly into the bore 65 to form therewith a spring barrel. A spiral spring 70 is positioned in the bore 65 outside of the hub 69 and has an outer looped end 71 secured to a depending pin 72 mounted on the upper plate 62. The inner looped end 73 of the spring 70 is secured to an upstanding pin 74 mounted in the ratchet wheel 66. The spiral spring 70 normally urges the ratchet wheel 66 in a clockwise direction when viewed from the side thereof toward the upper plate 62. The ratchet wheel 66 has a depending pin 75 mounted thereon adjacent the peripheral edge thereof for engagement with the arm 57, as described below. Ratchet teeth 76 are formed on the peripheral edge of the ratchet wheel 66 for reasons to be assigned. The ratchet wheel 66 has its center of rotation coaxial with that of the shaft 56.

Figure 2:
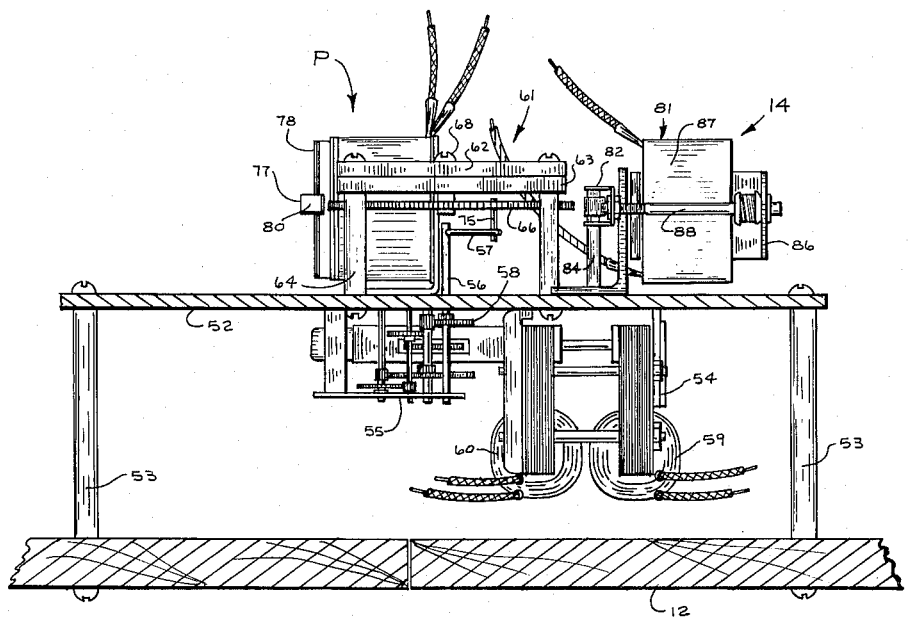
FIGURE 2 is a fragmentary vertical sectional view taken on line 2—2 of FIGURE 1, looking in the direction of the arrows.

A ratchet pawl generally indicated at P includes a phosphor bronze spring tooth 77 secured to the armature 78 of an electromagnet 79. The spring tooth 77 has the free end thereof bent at 45 degrees toward the ratchet wheel 66 to form an engaging element 80, as can be seen in FIGURES 1 and 2. When the electromagnet 79 is energized, the engaging element 80 is brought into contact with the teeth 76 of the ratchet wheel 66 locking the ratchet wheel 66 against rotation in a clockwise direction but permitting rotation of the ratchet wheel 66 in a counterclockwise direction.

A ratchet wheel lock assembly 81 is mounted on the panel 52 adjacent the side of the ratchet wheel assembly 61 opposite the ratchet pawl tooth 77. The ratchet wheel lock assembly 81 includes an arm 82 having its end 83 pivotally mounted on a post 84 extending upwardly from the panel 52. The arm 82 carries an arcuate serrated brass shoe 85 which is adapted for engagement with the teeth 76 of the ratchet wheel 66 to lock the ratchet wheel 66 against rotation in either direction. The arm 82 is connected to the armature 86 of an electromagnet 87 by a spring linkage 88. When the electromagnet 87 is energized, the shoe 85 is pressed forcefully against the teeth 76 on the periphery of the ratchet wheel 66 locking the ratchet wheel 66 against rotation. When the electromagnet 87 is de-energized, the shoe 85 disengages from the teeth 76 freeing the ratchet wheel 66 for rotation.

Figure 3:
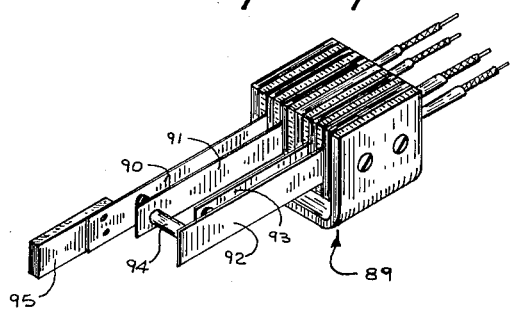
FIGURE 3 is a perspective view of one of the switch blocks forming a part of the invention.

Referring now to FIGURES 1 and 3, the switch assembly 89 is mounted on the panel 52 adjacent one side of the ratchet wheel assembly. The switch assembly 89 includes a pair of spring arms 90, 91 having normally open contacts. A second pair of spring arms 92, 93 having normally closed contacts are also mounted on the switch assembly 89. An insulated finger 94 is carried by the spring arm 91 engaging with the spring arm 92 so that movement of the spring arm 91 will cause movement of the spring arm 92. An insulating block 95 is secured to the spring arm 90 and extends longitudinally therefrom into the path of the arm 57 so that rotation of the arm 57 in a clockwise direction can move the spring arm 90 into contact with the spring arm 91 and through the finger 94 move the spring arm 92 out of contact with the spring arm 93. The relationship of the ratchet wheel assembly 61 to the arm 57 and to the switch assembly 89 is such that, during counterclockwise rotation of the arm 57, it impinges against the depending pin 75 rotating the ratchet wheel 66 in a counterclockwise direction, winding the spring 70. On clockwise rotation of the arm 57, it eventually engages the insulated block 95 where it first closes the normally open contacts of the spring arms 90, 91 and then successively opens the normally closed contacts of the spring arms 92, 93.

Referring to FIGURE 1, a conventional electromagnetically operated four-pole double-throw relay switch 96 is secured to the panel 52 adjacent the ratchet wheel lock assembly 81.

The invention as described above is used in conjunction with standard components normally installed on electrically driven oil well pumping installations.

These standard components consist of appropriate conductors connecting the pump motor to the source of electrical energy through a contactor which is opened and closed at times predetermined by the settings of a time switch. There are several standard types of time switches, but each incorporates a dial driven one revolution in 24 hours by a small synchronous electric motor. This dial carries a series of settable dogs which open and close an electric circuit at the times determined by the settings of the dogs. The mechanical arrangement of the time switch is such that the switch can be made to close at any predetermined time of the day and can be made to open after any predetermined time interval has elapsed. Practically, the time interval during which the switch remains closed is usually a multiple of 15 minutes.

Figure 9:
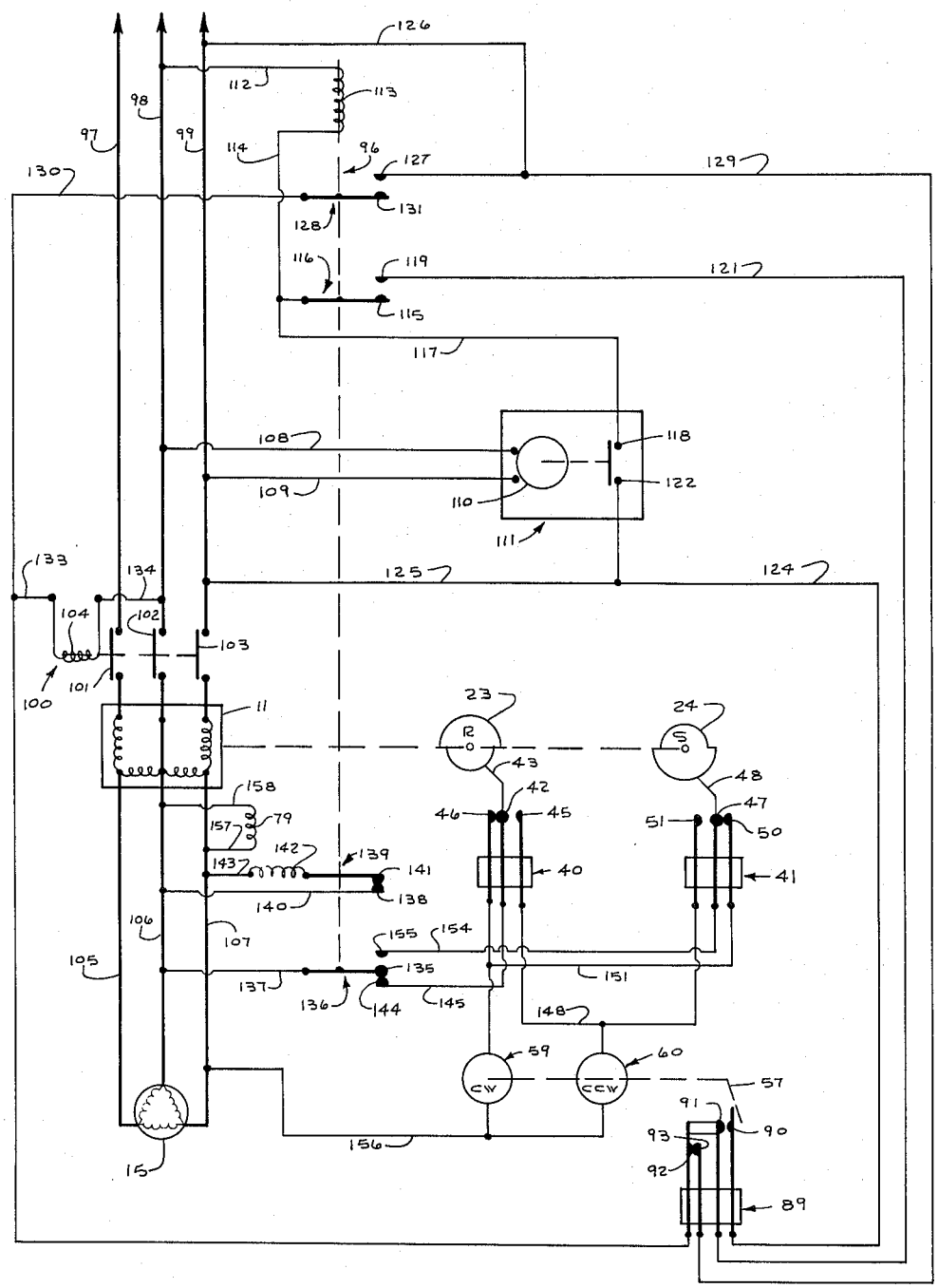
FIGURE 9 is a wiring diagram.

The electric circuits of the pump-off control are illustrated in FIGURE 9. Conductors 97, 98 and 99 are connected to a source of electric energy which is, in this case, a 440-volt, 3-phase supply. It should be understood that with minor design changes the invention can be caused to function with any standard source of alternating current, either single phase or polyphase. A standard pump motor contactor 100 is provided with contacts 101, 102 and 103 respectively connected in the conductors 97, 98, 99. The contactor 100 is normally open, being closed by an electromagnetic coil 104, as described below.

The conductors 97, 98, 99 extend to the line side terminals of the watt-hour meter 11. Conductors 105, 106, 107 respectively connect the load side of the watt-hour meter 11 to the pump motor 15 so that when the contactor 100 is closed electric energy is supplied to the pump motor 15 through the watt-hour meter 11 which measures the energy in a conventional manner and drives the run cam 23 and set cam 24 at an instantaneous angular velocity which is proportional to the instantaneous rate at which electric energy is being supplied to the pump motor 15.

A pair of conductors 108 and 109 connect the terminals of a timer motor 110 of a time switch 111 to conductors 98 and 99. A conductor 112 connects one terminal of the coil 113 of the relay switch 96, previously described, to the conductor 98. The other terminal of the coil 113 is connected by means of a conductor 114 to a contact 115 of a switch 116 on the relay switch 96. A conductor 117 joins the contact 115 of the switch 116 to a contact 118 of the time switch 111. The contact 119 of switch 116 is connected to the contact 91 of the switch 89 by a conductor 121. The contact 122 of the time switch 111 is connected to contact 90 of the switch 89 by a conductor 124. Contact 122 is connected to the conductor 99 by a conductor 125. A conductor 126 connects the conductor 99 to a contact 127 of the switch 128 of relay switch 96. A conductor 129 connects the contact 93 of the switch assembly 89 to contact 127 of switch 128 on the relay switch 96.

A conductor 130 connects the contact 131 of the switch 128 to the contact 92 of the switch 89. A conductor 133 connects the contact 92 of the switch 89 to one terminal of the pump motor contactor-actuating coil 104 through the conductor 130; the other terminal of the coil 104 is connected to conductor 98 by conductor 134. The contact 135 of a switch 136 on relay switch 96 is connected to the conductor 106 by conductor 137. The contact 138 of a switch 139 on relay switch 96 is connected by conductor 140 to the conductor 106.

The contact 141 of the switch 139 is connected to one terminal of the lock magnet coil 142. The other terminal of the lock magnet coil 142 is connected to the conductor 107 by the conductor 143. The contact 144 of the switch 136 is connected by conductor 145 to the contact 42 of a switch 40 situated on the mounting plate 18 and actuated by the run cam 23. The contact 45 of the switch 40 is connected by conductor 148 to the contact 51 of the switch 41 and to one terminal of the motor coil 60. The contact 46 of the switch 40 is connected by conductor 151 to the contact 50 of the switch 41 and to one terminal of the motor coil 59.

The contact 47 of the switch 41 is connected by conductor 154 to the contact 155 of the switch 136. The other terminal of motor coil 59 and the other terminal of motor coil 60 are connected by conductor 156 to the conductor 107. The switch 89 is actuated by the electric motor 54 through a gear train 55, slip clutch 58, output shaft 56, and arm 57 acting on the switch assembly 89, as previously described. One terminal of the ratchet electromagnet coil 79 is connected by conductor 157 to conductor 107. The other terminal of the ratchet electromagnet coil 79 is connected by conductor 158 to conductor 106.

In the use and operation of the invention, the following assumptions are made:

(1) The oil well is in a pumped-up state each time the pump motor starts. This means that the pumping schedule, as determined by the positioning of the dogs on the time switch, is such that the time interval allowed between the times the pump motor is started is long enough to allow the well to fill with fluid.

(2) The well, at the time the pump motor starts, contains enough fluid that the well will not empty, or "pump off," in less than 15 minutes, but it eventually will "pump off."

The decision as to how frequently to pump the well will be made by the well operator on the basis of his knowledge of the well characteristics. This decision having been made, the well operator will set the dogs on the time switch 111 so that the dogs will close the switch 111 at the times when the well is to pump and will open the switch 111 after, say, 15 minutes. At the instant when the appropriate dog closes the switch 111, the relay coil 113 is energized, thus closing switch 128 and so energizing the pump motor contactor-actuating coil 104. Energizing coil 104 closes the contacts 101, 102 and 103, thus energizing the pump motor 15. This also energizes the ratchet magnet coil 79, causing the ratchet-engaging element 80 to engage with the serrations 76 on the periphery of the ratchet wheel 66. The closing of the time switch 111, resulting in the energizing of relay coil 113, not only closes switch 128 but also opens switch 139, opens contacts 135, 144, closes switch 116, and closes contacts 135, 155. The opening of switch 139 ensures that the ratchet wheel lock magnet coil 142 remains de-energized, thus preventing the ratchet wheel lock assembly 81 from engaging with the ratchet wheel 66.

The opening of contacts 135, 144 ensures that the switch 40 actuated by the run cam 23 will have no effect for the present on the electric motor 54. Since, initially, contacts 47, 51 were closed, the closing of contacts 135, 155 energizes the timer motor coil 60. As a result, at the instant the pump motor 15 starts, the timer motor 54 starts to turn the timer arm 57 in a counterclockwise direction. At the same instant the pump motor 15 starts, the watt-hour meter 11 begins to turn the set cam 24 and the run cam 23 in a counterclockwise direction. As the timer arm 57 begins to turn counterclockwise, it impinges on pin 75 and rotates the ratchet wheel 66 counterclockwise, thus winding the spring 70. Eventually, the watt-hour meter 11 will cause the set cam 24 to rotate sufficiently to raise the set cam follower 48, thus closing contacts 47, 50 and opening contacts 47, 51. Opening contacts 47, 51 de-energizes the coil 60 and closing contacts 47, 50 energizes the coil 59. Thus, the timer arm 57 starts to rotate clockwise and continues to rotate clockwise until it comes to rest against insulated block 95 where it stays until the set cam follower 48 is lowered by the set cam 24.

When the set cam follower 48 is lowered, contacts 47, 50 open, de-energizing coil 59, and contacts 47, 51 close, energizing coil 60 which drives the timer arm 57 counterclockwise again. The timer arm 57 will rotate counterclockwise and possibly turn the ratchet wheel 66 further counterclockwise than it was turned during the first cycle of operation of the timer arm 57. This sequence of events continues to repeat with the set cam 24 alternately reversing the direction of rotation of the timer arm 57. After the timer arm 57 has made one or two complete cycles, it should start from contact with the insulated block 95, turn counterclockwise just far enough to barely touch the pin 75 before being reversed, and then turn clockwise to rest for a short period of time against the insulated block 95 before again starting to travel counterclockwise toward the pin 75. It is apparent that the angle through which the timer arm 57 turns is inversely proportional to the net energy passing through the watt-hour meter 11 required to turn the set cam 24 through the fraction of a revolution represented by the portion of the set cam 24 which does not lift the set cam follower 48.

It should be noted that the pawl P prevents the ratchet wheel 66 and its pin 75 from following the timer arm 57 as the timer arm 57 turns clockwise. It should be noted that the set cam 24 is designed to allow more time for the timer arm 57 to turn clockwise than counterclockwise. This is done so as to ensure that the timer arm 57 always starts from the same place each time it starts to turn counterclockwise. Since the speed of rotation of the set cam 24 determines the length of time during which the timer arm 57 rotates counterclockwise, it is apparent that the angle through which the timer arm 57 turns from the time it leaves contact with the insulated block 95 until the time it touches the pin 75 is inversely proportional to the amount of electric energy passing through the watt-hour meter 11 in the same time interval.

After remaining closed about 15 minutes, the switch 111 is opened by one of the previously set dogs. When this happens, the set cam 24 and the run cam 23 may be in any position but it is assumed that contacts 47, 50 are open and contacts 47, 51 are closed. When the time switch 111 opens, the timer arm 57 may be either impinging on the insulated block 95 or not impinging on the insulated block 95. These are the two conditions which will be considered below. Assuming that the timer arm 57 is not impinging on the insulated block 95, then contacts 90, 91 will be open and contacts 92, 93 will be closed at the time of opening of switch 111. Since switch 111 is open, the relay coil 113 is de-energized, closing switch 139, opening switch 128, opening switch 116, opening contacts 135, 155 and closing contacts 135, 144. The closing of switch 139 energizes lock magnet coil 142 forcing the ratchet wheel lock shoe 85 against the ratchet wheel 66. This prevents the ratchet wheel 66 from moving either clockwise or counterclockwise until the ratchet wheel lock assembly 81 is released.

The locking of the ratchet wheel 66 signifies that the setting phase of operation of the invention is finished and the running phase is begun. Since switches 128 and contacts 92, 93 are connected in parallel, the opening of switch 128 when the relay coil 113 is de-energized by the opening of switch 111 has no effect. Likewise, since contacts 90, 91 are open, the opening of switch 116 when the coil 113 is de-energized has no effect. The opening of contacts 135, 155 prevents the set cam 24 from controlling which of the timer motor coils 59, 60 is to be energized. The closing of contacts 135, 144 in effect transfers the control of the timer motor 54 to the run cam 23 which actuates contacts 42, 45 and 42, 46. Thus, when the time switch 111 opens, de-energizing the coil 113 and closing contacts 135, 144, the timer motor coil 59 is energized. The timer motor coil 59 starts to drive the timer arm 57 clockwise toward the insulated block 95 on the switch assembly 89. However, before the timer arm 57 touches the insulated block 95, the run cam 23 will cause the run cam follower 43 to raise, closing contacts 42, 45 and opening contacts 42, 46. Opening contacts 42, 46 de-energizes timer motor coil 59 and closing contacts 42, 45 energizes timer motor coil 60.

Timer motor coil 60 drives the timer arm 57 counterclockwise until it stalls against the pin 75 on the ratchet wheel 66, which cannot move because the ratchet wheel lock shoe 85 is engaged. The timer arm 57 remains stalled against the pin 75 until the run cam 23 turns far enough to lower the run cam follower 43. This causes a reversal of the direction of rotation of the timer arm 57 which is brought about by the closing of contacts 42, 46 and the opening of contacts 42, 45 by the run cam 23.

The timer arm 57 then starts from the pin 75 where it was stalled and turns clockwise until the run cam 23 again opens contacts 42, 46 and closes contacts 42, 45 which reverses the direction of rotation of the timer arm 57. Thus, it is apparent that the timer arm 57 alternately turns clockwise and counterclockwise as determined by the position of the run cam 23.

When the set cam 24 was controlling the timer arm 57, the timer arm 57 was allowed to turn counterclockwise starting from contact with the insulated block 95 through an angle determined by how far the timer motor coil 59 could turn the timer arm 57 in the time necessary for the set cam 24 to turn 175 degrees. The run cam 23 is so designed that the angle during which the timer arm 57 is allowed to rotate clockwise is adjusted by setting the adjustable segment 30 relative to the run cam 23. Assume for illustration that the adjustable segment 30 is set so that the run cam follower 43 is raised during 185 degrees of rotation of the run cam 23. With this setting of the adjustable segment 30 and with the run cam 23 in control of the timer motor coils 59 and 60, the timer arm 57 would have the time required for 175 degrees of cam rotation in which to move from the pin 75 clockwise. With the adjustable segment 30 set in this manner, the timer arm 57 at the end of its clockwise travel would barely impinge on the insulated block 95 and thus would close contacts 90, 91 and open contacts 92, 93. This would shut off the pump motor 15 by means which will be discussed below.

The pump motor 15 is to be shut down for any appreciable (say 6%) decrease in the energy delivered to the pump motor 15 in a period of time spanning several stroke cycles of the pump. This is accomplished by setting the adjustable segment 30 of the run cam 23 so that the cam follower 43 is raised during 195 degrees and is not raised during 165 degrees of cam rotation.

This means that, before this change in setting of adjustable segment 30 was made, the time required for 175 degrees of cam rotation was allowed for clockwise travel of the timer arm 57; now, only the time required for 165 degrees of cam rotation is allowed. It follows that, after the change in setting of the adjustable segment 30, the timer arm 57 can cover only roughly 94% of the clockwise angle measured from the pin 75 to the insulated block 95. Thus, the timer arm 57 will not touch the insulated block 95 before the run cam 23 reverses the direction of rotation of the timer arm 57. However, because the time spanning 195 degrees of cam rotation is allowed for counterclockwise rotation, the timer arm 57 will always start its clockwise rotation from the same place; namely, from against the pin 75.

Now, assume that the oil well pumps off. The rate of energy consumption by the pump motor 15 decreases, say 10%. As a result of the 10% decrease in the rate at which energy is delivered to the pump motor 15, the watt-hour meter 11 turns the cams 23 and 24 10% more slowly, thus allowing the timer arm 57 10% longer to travel clockwise than before pump off occurred. This added time is more than enough to allow the timer arm 57 to start from the pin 75 and to travel clockwise to impinge on insulated block 95 and thus to close contacts 90, 91 and to open contacts 92, 93. Closing contacts 90, 91 has no effect because switch 116 is open. Opening contacts 92, 93 de-energizes coil 104, opening contacts 101, 102 and 103 and so cutting off the pump motor 15. Also the ratchet magnet coil 79 and the lock magnet coil 142 are de-energized by the opening of contacts 101, 102 and 103; this frees the ratchet wheel 66 so that the torque of the spring 70 turns the ratchet wheel 66 clockwise until the pin 75 rests against the timer arm 57. The well remains shut down until the dogs again close the time switch 111 and the cycle above repeats itself. Note that when the well shuts down, the device is left in the state assumed at the beginning of the description of its operation in that the timer arm 57 is impinging on the insulated block 95 and the pin 75 is held against the timer arm 57 by the clockwise torque of the spring 70.

It was stated above that when the switch 111 was opened by the dogs 15 minutes after the well began to pump, timer arm 57 might or might not be impinging on the insulated block 95. In the explanation above, it was assumed that at the instant the switch 111 opened, the timer arm 57 was not impinging on the insulated block 95. Now, assume that the timer arm 57 is impinging on the insulated block 95 when the switch 111 opens. Because of the pressure of the timer arm 57 on the insulated block 95, contacts 92, 93 will be open and contacts 90, 91 will be closed. Since contacts 92, 93 and switch 128 are in parallel, opening contacts 92, 93 will have no effect. The fact that contacts 90, 91 are closed ensures that the opening of switch 111 will not de-energize the relay coil 113. Thus, at the time of the opening of the switch 111 by the dogs, the well does not shut down even though the timer arm 57 is holding contacts 92, 93 open and contacts 90, 91 closed. Note that if contacts 90, 91 were not present when switch 111 opened, the fact that the timer arm 57 was holding contacts 92, 93 open would allow the coil 113 to be de-energized, opening switch 128 and so de-energizing coil 104 and shutting down the pump motor 15. But as long as the timer arm 57 holds contacts 90, 91 closed, the fact that contacts 92, 93 are open does not shut down the well.

Now, as the well continues to pump, the run cam 23 which is controlling the timer motor coils 59 and 60 will eventually energize the timer motor coil 60 which will cause the timer arm 57 to move counterclockwise from the insulated block 95. The arrangement of switch assembly 89 is such that as timer arm 57 moves counterclockwise, contacts 92, 93 close and an instant later contacts 90, 91 open. The closing of contacts 92, 93 completes a circuit to keep the coil 104 energized even though the opening of contacts 90, 91 de-energizes the coil 113, opening switch 128, thus breaking the circuit which had been energizing the coil 104. After this de-energizing of coil 113 and the actuation of all the switches associated with it, the operation of the invention is exactly the same as described previously. It is apparent from the above explanation that the contacts 90, 91 act as an interlock to prevent shutting down the well in the event that the timer arm 57 happened to be resting against the insulated block 95 at the instant when the switch 111 opened.

In summary then, it can be said that the time switch 111 starts the well, allows the device 15 minutes in which to determine the rate of electric energy consumption by the pump motor 15 and to set itself accordingly, and then transfers control of the well to the device. The device allows the well to pump until the rate of energy consumption by the pump motor 15 decreases by a pre-set amount, signifying that pump off has occurred. When pump off occurs, the device shuts off the pump and resets itself to await the restarting of the pump by the time switch 111.

Having thus described the preferred embodiment of the invention, it should be understood that numerous structural adaptations and modifications may be resorted to without departing from the scope of the appended claims.

I claim:

1. An electric motor control of the type adapted to actuate a circuit breaker controlling the flow of electric current to an electric motor comprising an electromechanical means for continuously measuring the electric demand of an electric motor, a reversible electric timer, means on said electromechanical means for alternately driving said timer in opposite directions for a time in each direction inversely proportional to the electric demand rate of the electric motor, a switch adapted to actuate said circuit breaker, and means on said timer for closing said switch upon a predetermined drop in electric demand of the electric motor which continues for at least a predetermined period of time.

2. An electric motor control of the type adapted to interrupt the flow of electric current to an electric motor upon a drop in electric demand of the electric motor comprising means for measuring the electric demand of an electric motor, means set by said measuring means at the upper limit of electric demand of said electric motor during a period of time, means for interrupting the flow of electric current to the electric motor, and means for actuating said interrupting means upon a predetermined drop of electric demand of said electric motor from the means set by said measuring means, said means for measuring electric demand includes a pair of cams driven by said measuring means, a single-pole double-throw switch actuated by each of said cams, said means set by said measuring means including a reversible timer actuated by said single-pole double-throw switches, said timer energizing the means for actuating said interrupting means.

References Cited by the Examiner
UNITED STATES PATENTS

| | | | |
|---|---|---|---|
| 2,689,321 | 9/1954 | Vogel | 318—474 |
| 2,947,931 | 8/1960 | Hubby | 318—474 |
| 2,969,493 | 1/1961 | Dunigan | 319—476 |
| 3,075,466 | 1/1963 | Agnew et al. | 318—474 |

MILTON O. HIRSHFIELD, *Primary Examiner.*

ORIS L. RADER, S. GORDON, *Assistant Examiners.*